March 12, 1929.  C. W. GODMAN  1,705,011

WHEEL REMOVER

Filed Jan. 14, 1928

Inventor

C. W. Godman

By Mason Fenwick & Lawrence
Attorneys

Patented Mar. 12, 1929.

1,705,011

UNITED STATES PATENT OFFICE.

CLAUD W. GODMAN, OF FALMOUTH, KENTUCKY.

WHEEL REMOVER.

Application filed January 14, 1928. Serial No. 246,839.

This invention relates to improvements in wheel removers, particularly of an adjustable type adapted for application to any ordinary car where the hub caps and threads are on the outside of the hub.

An object of this invention is to provide an adjustable wheel remover or puller which may be easily brought into operative relationship with the hub of a wheel in such a manner that the wheel may be easily removed by a sharp blow with a hammer upon an axle screw or other suitable element.

Other objects of this invention will appear from the following detailed description of the device and as disclosed in the single sheet of drawings which is herewith made a part of this application.

Figure 1:
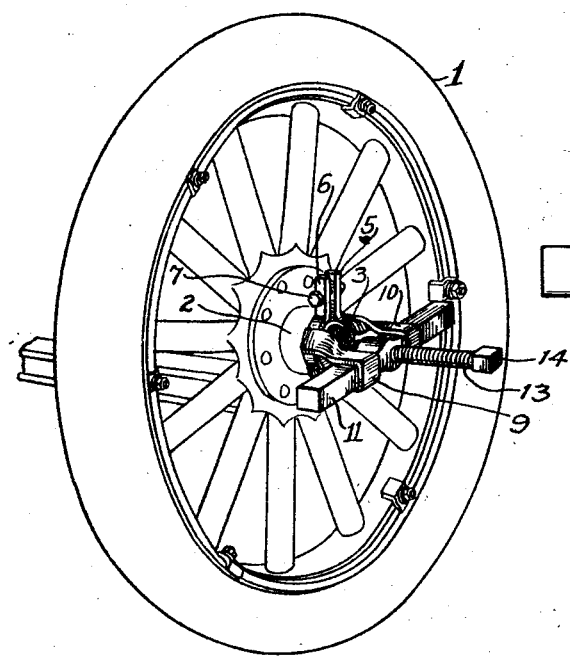
Figure 1 illustrates a perspective view of the wheel remover in an adjusted and operative relationship upon the hub wheel.
Figure 2:
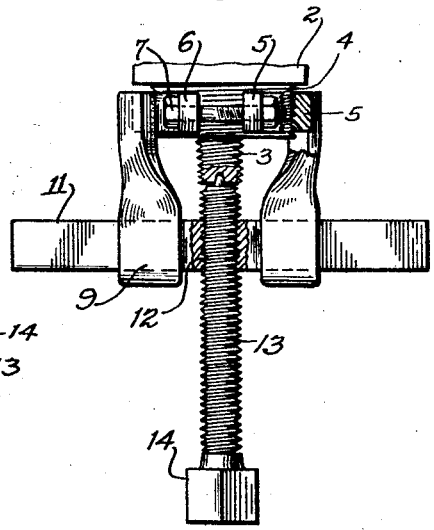
Figure 2 illustrates a side elevational view of the wheel remover.
Figure 3:
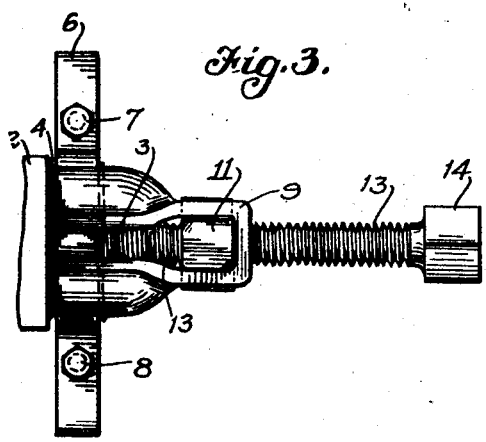
Figure 3 represents an end elevational view of the wheel remover.
Figure 4:
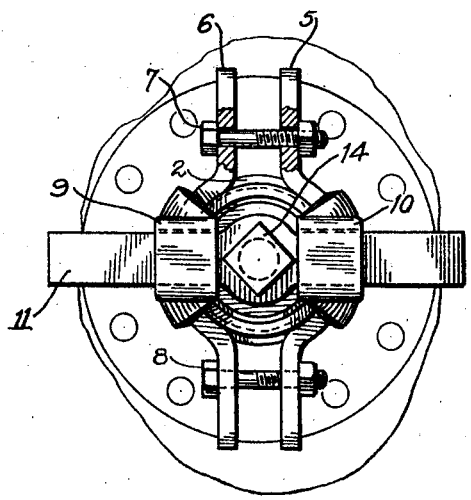
Figure 4 illustrates a front elevational view of the wheel remover.

In the adjustable wheel remover or puller, according to this invention, it is preferred that numeral 1 designates the wheel having hub portion 2, which is rotatably mounted upon an axle shaft 3. The hub portion 2 is ordinarily provided with hub cap threads 4 adapted to receive in operative relationship thereon a pair of puller clamps 5 and 6, which are made of any suitable material, such as wrought iron, and formed in such a manner that they may fit in threaded relationship over hub member 3 and clamped firmly in position by means of adjustable bolt members 7 and 8 extending through portions of the clamping elements 5 and 6. Each one of the clamping members 5 and 6 is adapted to have integrally formed therewith by means of welding casting, or otherwise, bracket or loop portions 9 and 10 formed in such a manner that they may receive in slidable relationship therewith an axle bolt bar 11 made of any suitable material, such as wrought iron, and formed having a threaded opening 12 adapted to receive in threaded relationship therein an axle bolt 13, the inner edge of which is adapted to contact with axle shaft 3 and the outer end being provided with a suitable members 14 upon which tension may be readily brought to bear by means of a hand wrench or otherwise.

In operation, this invention provides a very efficient adjustable wheel remover and puller which may be applied to any kind of a car where the hub cap threads are available or on the outside of the hub. The pair of adjustable clamps 5 and 6 are preferred to be threaded in such a manner that they may be received by the average hub cap threads. It has been found from experiment that the device will hold securely enough on the threads where it does not exactly fit in order to allow the removal of the wheel. The wheel remover primarily is composed of six separate parts, simple of construction and inexpensive of manufacture. In operation, it is merely necessary to adjust the puller clamps 5 and 6 to the wheel hub 3. This can be accomplished by bringing tension on the bolt members 7 and 8. The bolt bar 11 is preferred to be slidably positioned in the bracket portions 9 and 10. The axle bolt 13 extends through the axle bolt bar and contacts with the end of the axle 3 in such a manner that the hub and axle may be separated when tension is brought to bear on the axle bolt by means of a hand wrench or otherwise.

Substitutions and alterations may be made in the above disclosure, both in the specification and drawings within the scope of the appended claim without affecting the merits of this invention.

What I claim is:

In a wheel remover, a plurality of clamping members, an axle bolt bracket portions integrally formed from the clamping members, a bolt bar slidably positioned in the bracket portions, having an opening therein for receiving in threaded relationship the axle bolt, means in the clamping members for bringing tension to bear therebetween.

In testimony whereof I affix my signature.

CLAUD W. GODMAN.